Sept. 24, 1957 W. O. TEETERS 2,807,388
VALVE CLAMP
Filed Feb. 11, 1955
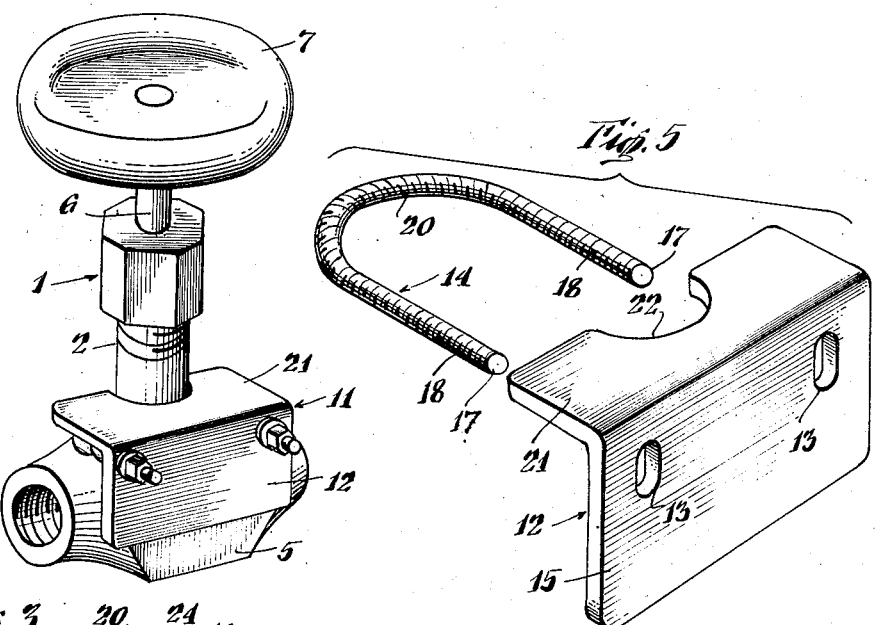
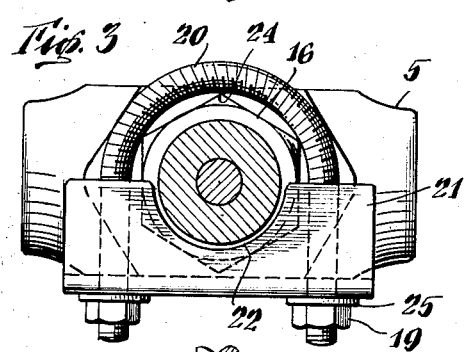
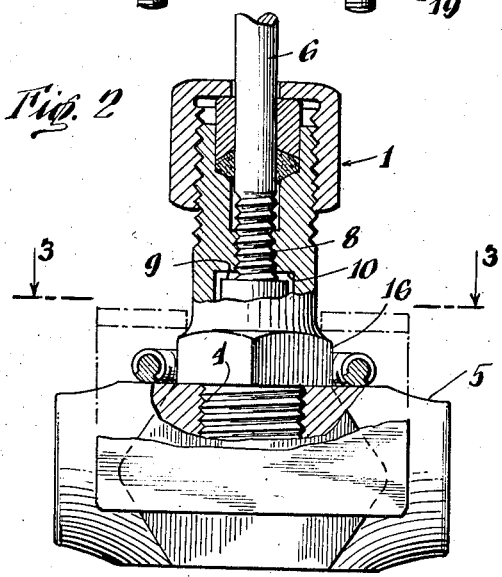
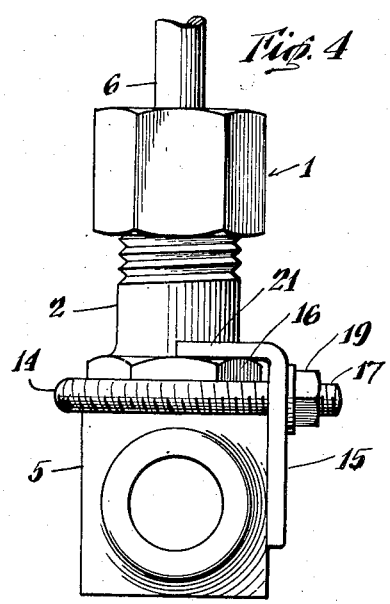
INVENTOR
WILBUR O. TEETERS
BY
ATTORNEY

United States Patent Office 2,807,388
Patented Sept. 24, 1957

2,807,388

VALVE CLAMP

Wilbur O. Teeters, Norwood, N. J., assignor to Hoke Incorporated, Englewood, N. J., a corporation of New York Application February 11, 1955, Serial No. 487,579

3 Claims. (Cl. 220—39)

The present invention relates to valves and more particularly to a clamp to lock screw-connected valve bonnets and bodies together.

It has been found advantageous to manufacture many valves with separate bonnet and body portions and to fasten them together by a threaded connection. Such valves operate satisfactorily in normal use, however careless or urgent usage of these valves has, on occasions, resulted in the inadvertent separation of the body and the bonnet. This separation endangers life and property due to the accompanying release of gases or fluids which may be under dangerously high pressures or which may be inflammable or toxic.

The separations occur when the valve stem becomes jammed either at the end of its normal travel or during travel and the operator continues to turn the stem. Continued turning after jamming by wrenches or other tools has turned the bonnet with respect to the valve body and has unscrewed one from the other, causing serious accidents.

Accordingly, an object of this invention is to provide a removable means to simply and effectively lock the valve bonnet and body together.

Another object of the invention is to provide a valve bonnet clamp which may be used on common types of existing valves.

Another object of the invention is to provide a removable lock to prevent relative rotation between thread-fastened valve bonnets and bodies.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a perspective view of a valve with the clamp of the invention in place;

Fig. 2 is a side elevational view partially in section of the valve and clamp of Fig. 1 with the valve handle cut away;

Fig. 3 is a sectional view along the line 3—3 of Fig. 2;

Fig. 4 is a front elevational view of the valve and clamp of Fig. 1 with the valve handle cut away; and Fig. 5 is a perspective view of a disassembled clamp.

Referring to the drawing, there is shown a typical valve 1 with a bonnet 2 screw-fastened by threads shown at 4 to a valve body 5. Valve stem 6 is rotated by handle 7 in the usual manner so that threads 8 raise or lower stem 6 to seat and unseat a valve surface on a valve seat (not shown) in the valve body 5. Should the stem 6 become jammed with respect to bonnet 2 by the raising of shoulder 9 on stem 6 against stop 10 on the bonnet 2, or otherwise, the turning force on stem 6 will be transferred to bonnet 2. Bonnet 2 will then be unscrewed from valve body 5 when the stem 6 is turned in a direction to disengage thread 4.

In order to prevent this disengagement, a clamp 11 is provided having a plate 12 and a substantially U-shaped strap 14. The plate 12 has an abutment portion 15 which is adapted to fit on a side surface of the valve body 5 and to mount the strap 14. Strap 14 is mounted by suitably located apertures 13 in plate 12 so that it embraces the bonnet 2 adjacent to valve body 5. The ends 17 of strap 14 have threads indicated as 18 onto which nuts 19 are tightened to draw strap 14 tightly against bonnet 2 and plate 12 against body 5 to lock the relative positions of the bonnet 2 and valve body 5. The bonnet shown has a hexagonal gripping portion 16, which is normally provided on screw-connected bonnets to provide a wrench grip, and a stop to position the bonnet 2 with respect to the valve body 5. The strap 14 is preferably grooved or threaded along substantially its entire length, as shown. Thus the sharp edges of the portion 16 engage the threads or grooves 20 to prevent slippage between the bonnet 2 and the valve body 5. Plate 12 of clamp 11 preferably has a centering lip 21 extending generally at right angles from the top of abutment portion 15 and having a cutout 22 to partially encircle the bonnet 2 and to fix the position of plate 12 with respect to the bonnet 2.

Although in the clamp shown both abutment portion 15 and lip 21 of plate 12 are shown as being generally flat, they may be curved as is necessary to fit them to contact the valve body and the bonnet. Thus, where the valve body 5 has a rounded shape, portion 15 and lip 21 will be shaped to fit against them.

The surface contacted by the abutment portion 15 is preferably generally parallel to the axis of the valve bonnet as contrasted to surfaces which are perpendicular thereto to provide the maximum resistance to turning.

The U-shaped strap 14 provides an effective grip with bonnets having a round or curved cross section as well as with the polygonal one illustrated. Where the bonnet has a polygonal or cornered cross section adjacent valve body 5, the grooves or threads 20 may not be required. In this case, strap 14 preferably is made with a relatively soft surface compared to the bonnet so that corners 24 bite into the strap surface and thus provide a locking action between the bonnet 2 and the strap 14.

Washers 25 are preferably used between nuts 19 and abutment portion 15. In the preferred embodiment, a nut is shown on both of the ends of strap 14, however one end may have a pin or fixed head and the strap may be drawn tightly into place by the use of a single nut on the other end of the strap.

It will be seen that the present invention provides a relatively simple and efficient means for locking screw connected valve bonnets and bodies together. The device provides a secure locking means which at the same time is removable when necessary. The locking clamp may be applied to valves already in use as no modification of the valve is necessary and as the clamp is easily attached without the use of special tools or heating.

The clamp may be entirely formed of metal and thus may be made of the same metal or metal alloy as the particular valve being clamped and as is required by the surrounding atmosphere or the fluids being transmitted.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a valve, the combination of a body, a bonnet screw-connected thereto and having radial projections along a portion of its surface, a clamp to lock said body and bonnet together to prevent unintentional unscrewing comprising a plate having an abutment portion fitted against a surface of said body generally parallel to the axis of the bonnet threads and having a lip generally perpendicular to the abutment portion and abutting said bonnet at a portion spaced from the radial projections, a U-shaped strap having its ends threaded, a pair of apertures in said plate spaced to accommodate the threaded strap ends, said strap partially embracing said bonnet and engaging one or more of said radial projections and having its threaded ends passing through said apertures, and nuts on said threaded ends holding said plate and said strap together and against said body and said bonnet, thereby preventing relative rotation between said body and said bonnet.

2. The valve as claimed in claim 1 in which said strap is threaded along a substantial portion of its length.

3. In a valve, the combination of a body having a generally flat side surface portion, a bonnet screw-connected thereto and having radial projections along a portion of its surface, a clamp to lock said body and bonnet together to prevent unintentional unscrewing comprising a plate having a generally flat abutment portion fitted against said generally flat side surface portion of said body and having a lip generally perpendicular to the abutment portion and abutting said bonnet at a portion spaced from the radial projections, a U-shaped strap having its ends threaded, a pair of apertures in said plate spaced to accommodate the threaded strap ends, said strap partially embracing said bonnet and engaging one or more of said radial projections and having its threaded ends passing through said apertures, and nuts on said threaded ends holding said plate and said strap together and against said body and said bonnet, thereby preventing relative rotation between said body and said bonnet.

References Cited in the file of this patent

UNITED STATES PATENTS

| | | |
|---|---|---|
| 178,709 | Barker | June 13, 1876 |
| 2,698,760 | Roth et al. | Jan. 4, 1955 |